UNITED STATES PATENT OFFICE.

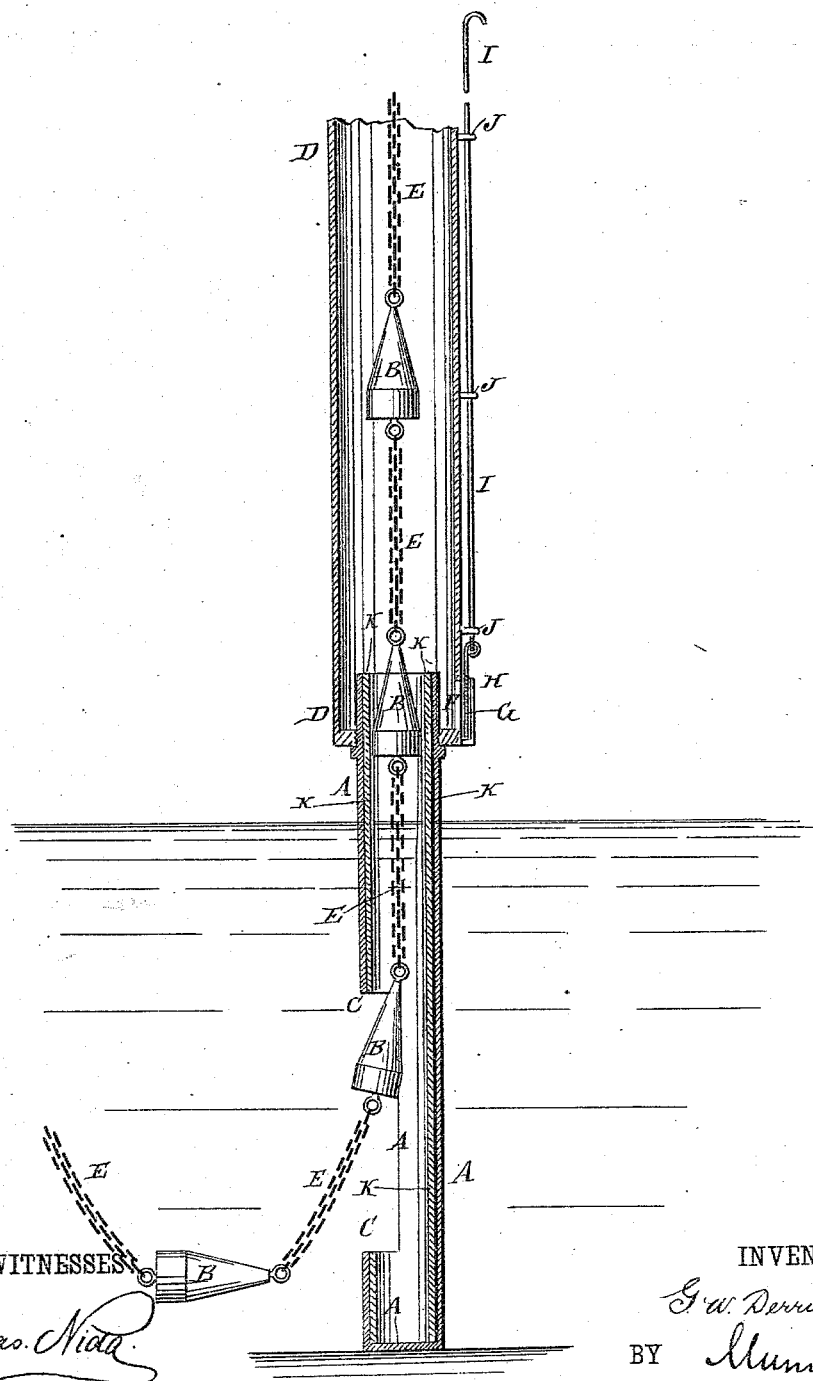

GEORGE WASHINGTON DERRICK, OF CENTERVILLE, OREGON.

CHAIN-PUMP.

SPECIFICATION forming part of Letters Patent No. 305,902, dated September 30, 1884.

Application filed March 10, 1884. (No model.)

*To all whom it may concern:*

Be it known that I, GEORGE WASHINGTON DERRICK, of Centerville, in the county of Umatilla and State of Oregon, have invented a new and useful Improvement in Well-Pipes for Endless-Chain Pumps, of which the following is a full, clear, and exact description.

Reference is to be had to the accompanying drawing, forming a part of this specification, and which is a sectional side elevation of my improvement.

The object of this invention is to lessen the friction and wear upon the rubber buckets of endless-chain pumps, and thus promote durability and ease of working in such pumps.

A further object of the invention is to allow the well-pipe to be readily cleared of sediment and the water to be readily discharged from its upper part to prevent freezing.

The invention consists of the combinations of parts, substantially as hereinafter fully set forth and claimed.

A is a pipe, which is made of iron or other suitable material, is preferably provided with a lining, K, of porcelain, and is made with an interior of such a size that the buckets B will fit into it exactly, and of such a length that one or more of the buckets B will always be within it, so that there will no backflow of water through the said pipe A. The lower end of the pipe A extends to and rests upon the bottom of the well or reservoir, and in the side of the lower part of the said pipe A is formed an opening, C, for the entrance of the buckets B. The upper end of the pipe A rises above the water-line, and is screwed into or otherwise secured, detachably and watertight, in a hole in the bottom of the pipe D, in such a manner that the upper end of the pipe A will project three inches, more or less, into the lower end of the pipe D.

The pipe D is made of wood or other suitable material, extends to the place where the water is to be discharged, and has an interior diameter greater than the diameter of the buckets B, attached to the endless chain E, so that there will be no friction between the said buckets and pipe.

In the side of the lower end of the larger pipe D is formed an opening, F, which is closed by a gate, G, sliding water-tight in grooved cleats H, or other guides attached to or formed upon the outer side of the said pipe D.

To the upper end of the gate G is attached the lower end of the rod I, which passes up through guides J, attached to the side of the pipe D, into such a position that it can be readily reached and operated to open and close the said gate G. With this construction, by opening the gate G any sediment that may have collected in the pipe D will be washed out by the rush of water from the said pipe. The gate G also allows the water to be discharged from the pipe D, to prevent the said water from being frozen within the said pipe and bursting or otherwise injuring it.

Having thus described my invention, I claim as new and desire to secure by Letters Patent—

In well-pipes for endless-chain pumps, the combination, with the larger pipe-section D, of the smaller pipe-section A, with its upper end extended a short distance thereinto, and providing a waste-water chamber in the lower end of the upper or larger pipe-section, around the upper projecting end of said smaller pipe-section, together with an outlet-opening, F, and gate G, substantially as shown and described, and for the purpose set forth.

GEORGE WASHINGTON DERRICK.

Witnesses:
 BENJ. F. MANSFIELD,
 BENJ. E. HERVEY.